United States Patent
Morishita et al.

(10) Patent No.: US 7,297,406 B2
(45) Date of Patent: Nov. 20, 2007

(54) LEAD-FREE ELECTRODEPOSITION COATING COMPOSITION AND COATED ARTICLE

(75) Inventors: Hiroyuki Morishita, Saitama (JP); Katsuyoshi Kaneko, Saitama (JP); Fumiaki Niisato, Saitama (JP); Toshiyuki Ishii, Tokyo (JP); Kageki Fujimoto, Tokyo (JP)

(73) Assignees: Honda Motor Co., Ltd. (JP); Nippon Paint Co., Ltd. (JP)

( * ) Notice: Subject to any disclaimer, the term of this patent is extended or adjusted under 35 U.S.C. 154(b) by 352 days.

(21) Appl. No.: 10/547,908

(22) PCT Filed: Mar. 3, 2004

(86) PCT No.: PCT/JP2004/002681

§ 371 (c)(1),
(2), (4) Date: Oct. 15, 2004

(87) PCT Pub. No.: WO2004/078856

PCT Pub. Date: Sep. 16, 2004

(65) Prior Publication Data

US 2007/0167582 A1    Jul. 19, 2007

(30) Foreign Application Priority Data

Mar. 5, 2003   (JP) ............................. 2003-059027

(51) Int. Cl.
- *B32B 27/38* (2006.01)
- *B32B 27/20* (2006.01)
- *B32B 27/26* (2006.01)
- *B32B 15/092* (2006.01)
- *C08L 63/00* (2006.01)

(52) U.S. Cl. ..................... 428/414; 428/413; 428/416; 428/418; 523/400; 523/414; 523/457; 205/317; 205/320

(58) Field of Classification Search ................ 205/316, 205/317, 320; 428/413, 414, 416, 418; 523/400, 523/414, 440, 457, 459
See application file for complete search history.

(56) References Cited

U.S. PATENT DOCUMENTS

| | | | | |
|---|---|---|---|---|
| 4,322,519 A | * | 3/1982 | Suenobu et al. | 528/45 |
| 4,419,467 A | * | 12/1983 | Wismer et al. | 523/414 |
| 4,973,392 A | | 11/1990 | Gupta | |
| 5,674,560 A | * | 10/1997 | Tanigami et al. | 427/202 |
| 6,136,895 A | * | 10/2000 | Koyama et al. | 523/411 |
| 6,413,642 B1 | * | 7/2002 | Wegner et al. | 428/418 |
| 6,669,835 B1 | * | 12/2003 | Honnick | 205/317 |
| 2004/0180779 A1 | * | 9/2004 | Ishikawa et al. | 502/152 |
| 2006/0124462 A1 | * | 6/2006 | Morishita et al. | 204/504 |

FOREIGN PATENT DOCUMENTS

| | | |
|---|---|---|
| GB | 2065151 | 6/1981 |
| GB | 2246572 | 2/1992 |
| JP | 05065438 | 3/1993 |
| JP | 7258586 | 10/1995 |
| JP | 2001055538 | 2/2001 |

* cited by examiner

*Primary Examiner*—Michael J. Feely
(74) *Attorney, Agent, or Firm*—Dorsey & Whitney LLP

(57) ABSTRACT

The present invention relates to a cationic electrodeposition coating composition substantially free of lead compounds, which is excellent in curability and can be finish-coated with a splendid appearance, and an article coated with the composition. The invention provides a lead-free electrodeposition coating composition excellent in curability and a coated article, the composition being capable of forming a coating film, which emits less tin compounds to have no influence on appearance of a finish coating film and film performances.

7 Claims, No Drawings ial application No. PCT/JP2004/002681 filed on
LEAD-FREE ELECTRODEPOSITION COATING COMPOSITION AND COATED ARTICLE The present application is a national phase application of International Application No. PCT/JP2004/002681 filed on Mar. 3, 2004, and claims priority from such International application pursuant to 35 U.S.C. § 365. In addition, the present application claims priority from Japanese Application No. 2003-059027 filed on Mar. 5, 2003. The entire disclosures of the above-identified International and Japanese applications are incorporated herein by reference.

TECHNICAL FIELD

The present invention relates to a cationic electrodeposition coating composition substantially free of lead compounds, which is excellent in curability and can be finish-coated with a splendid appearance, and an article coated with the composition.

BACKGROUND ART

Cationic electrodeposition coating compositions have been used for undercoating bodies and parts of automobiles, and required to form coating films with high corrosion resistance. The coating films need to be sufficiently cured at a predetermined baking temperature to achieve the high corrosion resistance. Dibutyltin compounds are generally used as a curing catalyst for lead-free cationic electrodeposition coating compositions. For example, dibutyltin oxide, which is usable as a catalyst for cross-linking reaction of a cationic electrodeposition coating composition, is described in JP-A-5-65438. Further, a cationic electrodeposition coating composition containing an organotin compound is disclosed in JP-A-7-258586, and a cationic electrodeposition coating composition containing a dialkyltin aromatic carboxylic acid salt as a curing catalyst is disclosed in JP-A-2001-55538.

However, in general, the dibutyltin compounds are disadvantageously volatile. For example, surface temperature of electrodeposition coating films is raised to 150 to 180° C. in a process of baking the films, coating the film with an upper film of a chipping primer, an intermediate coating, etc., or baking the upper film. The dibutyltin compounds are volatilized from the surface of the electrodeposition coating films at such a high temperature, transferred into the adjacent upper film of the chipping primer or the intermediate coating, and thereby negatively affects the film performances or appearance of the finish coating film in some cases.

DISCLOSURE OF THE INVENTION

An object of the present invention is to provide a lead-free electrodeposition coating composition excellent in curability and a coated article, the composition being capable of forming a coating film, which emits less tin compounds to have no influence on appearance of a finish coating film and film performances.

A lead-free cationic electrodeposition coating composition of the present invention comprises a binder resin and one or more organotin compounds as a curing catalyst, wherein the binder resin comprises a cationic base resin and a crosslinking agent, the mass ratio of the organotin compounds to the solid contents of the binder resin is 0.1 to 10% by mass, and the organotin compounds comprise more than 50% by mass of a monoalkyltin compound based on the total mass of the organotin compounds.

The lead-free cationic electrodeposition coating composition of the present invention preferably comprises 100 to 2,000 ppm of zinc ions. And the cationic base resin is preferably an amino-epoxy resin. The monoalkyltin compound may be monobutyltin oxide.

A coated article of the present invention comprises a substrate and an electrodeposition coating film formed thereon, which comprises the lead-free cationic electrodeposition coating composition. The coated article has at least a film of a chipping primer on the electrodeposition coating film in many cases. In the present invention, the excellent film performances can be achieved even in the case where the chipping primer is such that the adhesion or the appearance is negatively affected easily by transfer of tin atoms from the electrodeposition coating film.

DETAILED DESCRIPTION OF THE INVENTION

The present invention is described in detail below. In the lead-free cationic electrodeposition coating composition of the present invention, the term "lead-free" means that the composition substantially contains no lead (including lead in lead compounds). The detection limit of lead has been lowered year after year by advancement of analytical instruments, and in the present invention, the term "lead-free" specifically means that the lead content of the composition is 10 ppm or less.

The lead-free cationic electrodeposition coating composition of the present invention comprises one or more organotin compounds as a curing catalyst (or a dissociation catalyst for a blocked polyisocyanate compound). The organotin compounds comprise the monoalkyltin compound. The monoalkyltin compound is particularly preferably monobutyltin oxide though there are no particular restrictions thereon. Examples of the monoalkyltin compounds include monobutyltin trioctanoate, monobutyltin triacetate, monobutyltin tribenzoate, monobutyltin trioctylate, monobutyltin trilaurate, monobutyltin trimyristate, monomethyltin triformate, monomethyltin triacetate, monomethyltin trioctylate, monooctyltin triacetate, monooctyltin trioctylate, monooctyltin trilaurate, monolauryltin triacetate, monolauryltin trioctylate, and monolauryltin trilaurate. These alkyltin compounds may be used singly or in combination of 2 or more compounds.

The monoalkyltin compound may be used with other organotin compounds. Examples of the other organotin compounds include dialkyltin compounds such as dibutyltin oxide, dioctyltin oxide, dibutyltin dilaurate, and dibutyltin diacetate. In the present invention, the mass ratio of the monoalkyltin compound to the total of the organotin compounds needs to be more than 50% by mass. When the mass ratio is 50% by mass or less, the excess other organotin compounds are transferred into a film adjacent to the electrodeposition coating film to worsen the film performances and the appearance of the finish coating film. The mass ratio of the monoalkyltin compound to the total of the organotin compounds is preferably 60 to 100% by mass, more preferably 75 to 100% by mass.

When the mass ratio of the organotin compounds to the solid contents of the binder resin comprising the cationic base resin and the crosslinking agent is less than 0.1% by mass, the catalytic activity is insufficient. On the other hand, when the mass ratio of the organotin compounds is increased to more than 10% by mass, the catalytic activity cannot be correspondingly improved, and further, there is a case where the electrodeposition coating film is decomposed by over baking. The mass ratio of the monoalkyltin compound to the solid contents of the binder resin comprising the cationic base resin and the crosslinking agent is preferably 0.5 to 7.0% by mass.

A method for introducing the organotin compounds into the lead-free cationic electrodeposition coating composition is not particularly restricted. In the case where the organotin compounds are solid, the organotin compounds is preferably dispersed using a dispersing resin as well as pigments. Further, in the case where the organotin compounds are liquid, they may be dissolved in or mixed with the binder resin and introduced as a part of the binder component.

The lead-free cationic electrodeposition coating composition of the present invention may contain zinc ions. An inorganic zinc compound such as zinc oxide and zinc hydroxide or an organic zinc compound may be used to maintain the zinc ion content of the composition at the predetermined degree. The zinc compounds may be used alone or in combination of 2 or more compounds.

Examples of the organic zinc compounds include zinc salts of organic mono- or di-acids such as formic acid, acetic acid, butyric acid, caproic acid, octylic acid, lauric acid, myristic acid, palmitic acid, stearic acid, behenic acid, neodecanoic acid, acrylic acid, crotonic acid, isocrotonic acid, undecylenic acid, oleic acid, erucic acid, sorbic acid, linolic acid, linolenic acid, bisphenylacetic acid, bisphenylbutyric acid, bisphenylpropionic acid, biscyclopentane carboxylic acid, bisacetoacetic acid, benzoic acid, methylbenzoic acid, bismethoxybenzoic acid, bis(tert-butyl)benzoic acid, bishydroxybenzoic acid, phthalic anhydride, terephthalic acid, succinic acid, maleic acid, maleic anhydride, and fumaric acid.

The zinc ion content of the lead-free cationic electrodeposition coating composition is preferably 100 to 2,000 ppm, more preferably 300 to 1,000 ppm. When the zinc ion content is less than 100 ppm, there is a case where the dissociation catalyst to be hereinafter described cannot show sufficient activity, resulting in insufficient curing of the electrodeposition coating film. On the other hand, when the zinc ion content is more than 2,000 ppm, appearance of the film and the electrodeposition coating workability are deteriorated in some cases.

The cationic base resin used in the present invention is preferably such that the electrodeposition coating film has higher corrosion resistance. Examples of such cationic base resins include amino-epoxy resins, amino group-containing acrylic resins, amino group-containing polyester resins, etc. Among them, preferred are amino-epoxy resins. The amino-epoxy resins can be obtained that epoxy rings of an epoxy resin is opened by an amine compound such as an acid salt of a primary, secondary or tertiary amine, and cationized.

The amino-epoxy resin used as a starting material for the cationic base resin may be a polyphenol-polyglycidyl ether-type epoxy resin, which is a product of a reaction between epichlorohydrin and a polycyclic phenol compound such as bisphenol A, bisphenol F, bisphenol S, phenol novolac, and cresol novolak, or a modified epoxy resin having an oxazolidone ring. The epoxy resin is preferably the modified epoxy resin having an oxazolidone ring. The modified epoxy resin can be obtained by a dealcoholization reaction of an epoxy resin with a bisurethane compound prepared by a reaction between a diisocyanate compound and one active hydrogen compound or with a heterourethane compound prepared by a reaction between a diisocyanate compound and 2 or more active hydrogen compounds. In the case of using the modified epoxy resin having an oxazolidone ring as the base resin, the electrodeposition coating film is excellent in the corrosion resistance and physical properties.

The amine value of the cationic base resin is preferably 30 to 130, more preferably 40 to 80, and the number average molecular weight is preferably 1,000 to 20,000. When the amine value is less than 30, it is difficult to emulsify the cationic base resin. When the amine value is more than 130, there is a fear that the electric conductivity of the resin is increased, thereby reducing the gas pin property, reducing the Coulomb efficiency, or being disadvantageous in the electrodeposition coating workability including re-dissolubility, etc.

Examples of acids for neutralizing the cationic base resin include water-soluble organic acids such as formic acid, acetic acid, propionic acid, lactic acid, citric acid, malic acid, tartaric acid, and acrylic acid; and inorganic acids such as hydrochloric acid, phosphoric acid, and sulfamic acid. Among them, preferred are acetic acid, lactic acid, propionic acid, formic acid, and sulfamic acid.

Blocked polyisocyanate compounds and etherified melamine resins are preferably usable as the crosslinking agent contained in the lead-free cationic electrodeposition coating composition of the present invention. The blocked polyisocyanate compounds are such that isocyanate groups of a polyisocyanate compound are completely or partly blocked by a blocking agent. The blocking agent in the blocked polyisocyanate compound is dissociated by heating in the baking process after the electrodeposition, and the re-generated isocyanate groups are reacted with active hydrogen groups of the cationic base resin, thereby hardening the resin. The etherified melamine resins are obtained by etherifying melamine with an alcohol such as methanol and butanol. The etherified melamine resin is subjected to a transetherification with the cationic base resin to promote the crosslinking reaction in the baking process after the electrodeposition coating as the blocked polyisocyanate compound.

Examples of the polyisocyanate compounds used as a material for the blocked polyisocyanate compound include aliphatic diisocyanate compounds such as trimethylene diisocyanate, tetramethylene diisocyanate, pentamethylene diisocyanate, hexamethylene diisocyanate, 1,2-propylene diisocyanate, 1,2-butylene diisocyanate, 2,3-butylene diisocyanate, 1,3-butylene diisocyanate, ethylidene diisocyanate, and butylidene diisocyanate; aliphatic, cyclic diisocyanate compounds such as 1,3-cyclopentane diisocyanate, 1,4-cyclohexane diisocyanate, 1,2-cyclohexane diisocyanate, isophorone diisocyanate, and norbornane diisocyanate; aliphatic-aromatic isocyanate compounds such as m-phenylene diisocyanate, p-phenylene diisocyanate, 4,4'-biphenyl diisocyanate, 1,5-naphthalene diisocyanate, 1,4-naphthalene diisocyanate, 4,4'-diphenylmethane diisocyanate, 2,4- or 2,6-toluene diisocyanate or mixtures thereof, 4,4'-toluidine diisocyanate, and 1,4-xylene diisocyanate; aromatic diisocyanate compounds such as dianisidine diisocyanate, 4,4'-diphenyl ether diisocyanate, and chlorodiphenyl diisocyanate; triisocyanate compounds such as triphenylmethane-4, 4',4"-triisocyanate, 1,3,5-triisocyanate benzene, and 2,4,6-triisocyanate toluene; tetraisocyanate compounds such as 4,4'-diphenyl-dimethylmethane-2,2',5,5'-tetraisocyanate; and polymerized polyisocyanate compounds such as toluene diisocyanate dimer and toluene diisocyanate trimer. Among them, preferred polyisocyanate compounds are isophorone diisocyanate, norbornane diisocyanate, and 4,4'-diphenylmethane diisocyanate.

Examples of the blocking agents for blocking the isocyanate groups include halogenated hydrocarbons such as 1-chloro-2-propanol and ethylene chlorohydrin; aliphatic or heterocyclic alcohols such as n-propanol, furfuryl alcohol, and alkyl-substituted furfuryl alcohols; phenol compounds such as phenol, m-creosol, p-nitrophenol, p-chlorophenol, and nonylphenol; oxime compounds such as methyl ethyl ketoxime, methyl isobutyl ketone oxime, acetone oxime, and cyclohexanone oxime; active methylene compounds such as acetylacetone, ethyl acetoacetate, and diethyl malonate; aliphatic alcohols such as $\epsilon$-caprolactam, methanol, ethanol, and isopropanol; aromatic alcohols such as benzyl alcohol; glycol ethers such as ethylene glycol monomethyl ether, ethylene glycol monoethyl ether, ethylene glycol monobutyl ether, and diethylene glycol monomethyl ether; etc. Among them, preferred are methyl ethyl ketoxime and $\epsilon$-caprolactam.

In the lead-free cationic electrodeposition coating composition of the present invention, the solid content ratio of the cationic base resin/the crosslinking agent is preferably 50/50 to 90/10 by mass, more preferably 60/40 to 80/20 by mass. When the ratio is not within the range of 50/50 to 90/10, the curing efficiency is often insufficient.

An organic solvent may be used with water in the lead-free cationic electrodeposition coating composition. Examples of the organic solvents include water-miscible organic solvents such as methoxypropanol, ethyl cellosolve, propyl cellosolve, butyl cellosolve, 2-ethylhexyl cellosolve, n-hexyl cellosolve, methanol, ethanol, isopropyl alcohol, n-butanol, isobutanol, ethylene glycol dimethyl ether, diacetone alcohol, acetone, methyl ethyl ketone, methoxybutanol, dioxane, and ethylene glycol monoethyl ether acetate; and water-nonmiscible organic solvents such as xylene, toluene, methyl isobutyl ketone, hexane, carbon tetrachloride, 2-ethylhexanol, isophorone, cyclohexane, and benzene. Among them, preferred organic solvents are butyl cellosolve, 2-ethylhexyl cellosolve, and n-hexyl cellosolve, which are excellent in film forming properties. The amount of the organic solvent is preferably 0.1 to 10 parts by mass per 100 parts by mass of the solid contents of the cationic base resin and the crosslinking agent.

In the present invention, though the organotin compounds containing more than 50% by mass of the monoalkyltin compound are used as the dissociation catalyst for dissociating the blocking agent, other dissociation catalysts may be used as long as they do not reduce the advantageous effects of the present invention. Examples of the other dissociation catalysts include amine compounds such as N-methylmorpholine; and salts of metals such as strontium, cobalt, and copper. The amount of the other dissociation catalyst may be 200 parts by mass or less per 100 parts by mass of the organotin compounds of the main catalyst.

In addition, crosslinking resin particles, pigments, and various additives may be added to the lead-free cationic electrodeposition coating composition of the present invention if necessary. Efficiency of maintaining the thickness of the edge portion of the coated article can be improved by adding the crosslinking resin particles. The crosslinking resin particles may be generated from an acrylic resin, an epoxy resin, a phenol resin, a melamine resin, etc. The crosslinking resin particles are particularly preferably such as using an acrylic resin from the viewpoint of production easiness. The number average particle size of the crosslinking resin particles is preferably 0.02 to 30 μm.

Examples of the pigments include color pigments such as titanium oxide, iron oxide red, and carbon black; extender pigments such as aluminum silicate, precipitated barium sulfate, and silicon oxide; and rust preventive pigments such as an aluminum salt, a ferric salt, a titanium salt, a zirconium salt, a manganese salt, a cobalt salt, a nickel salt, a copper salt, a zinc salt, or a silicon salt of phosphomolybdic acid. In the case where the lead-free cationic electrodeposition coating composition contains such a pigment, the composition may further contain a resin for dispersing the pigment.

The lead-free cationic electrodeposition coating composition of the present invention is preferably prepared by dispersing the components in an aqueous medium of the organic solvent and water containing the above-mentioned water-soluble organic acid or the above-mentioned inorganic acid as the neutralizer.

The coated article of the present invention is obtained by coating a conductive substrate with the lead-free cationic electrodeposition coating composition of the present invention. The composition may be electrodeposited onto the conductive substrate to form the electrodeposition coating film, which may be coated with an overcoating film if necessary.

The conductive substrate may comprise any material that can be electrodeposition-coated, such as iron materials, steel materials, and aluminium materials. It is preferred that the lead-free cationic electrodeposition coating composition of the present invention is diluted with deionized water to have the solid concentration of 5 to 40% by mass, preferably 15 to 25% by mass, and the pH value of the composition is adjusted to 5.5 to 8.5, and then the composition is introduced into an electrodeposition bath, to form the electrodeposition coating film. The electrodeposition coating is preferably carried out under conditions of an electrodeposition bath temperature of 20 to 35° C., a coating voltage of 100 to 450 V, and a coating time of 1 to 5 minutes. In the process of baking the electrodeposition coating film after the electrodeposition, the substrate temperature is 100 to 250° C., preferably 140 to 220° C., and the curing time is 5 to 60 minutes, preferably 10 to 30 minutes. These baking conditions may be applied also in the case where the electrodeposition coating film is coated wet-on-wet with a chipping primer film or an intermediate coating film before curing the electrodeposition coating film and the films are simultaneously baked. The dry thickness of the electrodeposition coating film is suitably 5 to 40 μm, more preferably 10 to 30 μm. The above electrodeposition coating conditions may be controlled to obtain the dry thickness.

The chipping primer film and the intermediate coating film may be formed on thus-formed electrodeposition coating film in this order or in the reversed order, and then, an overcoating film such as a lustering agent-containing film and a clear film may be formed thereon, if necessary. The intermediate coating film and the overcoating film may be formed by using known compositions under known conditions for coating outer plates of automobiles, etc.

The chipping primer film is formed on metal articles such as automobile bodies, guardrails, and traffic signs to prevent the coating films of the metal articles from being cracked or peeled off by stones splashed from road surfaces, etc. The chipping primer may be selected from the viewpoints of the strength and the impact resistance of the film, and for example, may have composition comprising a combination of an acid-grafted polyolefin and a butylated melamine resin. Examples of such polyolefins include ethylene-propylene copolymers containing 50 mol % or more of propylene, and the acid component of the acid-grafted polyolefin may be maleic acid, maleic anhydride, etc. Such maleated polyolefin resins are described in JP-A-9-208882, JP-A-4-363371, etc., and T-5H manufactured by Kansai Paint Co., Ltd., BOR-904 manufactured by Sakai Chemical Industrial Co., Ltd., etc. are commercially available maleated polyolefin resins. In the coated article of the present invention, a large amount of the monoalkyltin compound is used as the catalyst for curing the electrodeposition coating film as described above, whereby the amount of the dialkyltin compounds is relatively small. Thus, only a small amount of the dialkyltin compounds are volatilized in the process of baking each films, etc., whereby the coated article excellent in film performances and appearance can be obtained even in the case where the chipping primer is such that the adhesion or the appearance is negatively affected easily by transfer of tin atoms from the electrodeposition coating film.

The invention will be described in more detail below with reference to Examples and Comparative Examples without intention of restricting the scope of the present invention. It should be noted that "part(s)" in Examples means "part(s) by mass".

PRODUCTION EXAMPLE 1

Preparation of Curing Agent 723 parts of isophorone diisocyanate, 333 parts of methyl isobutyl ketone, and 0.01 part of dibutyltin dilaurate were added to a flask equipped with a stirrer, a condenser, a nitrogen inlet tube, a thermometer, and a dropping funnel, and heated to 70° C. After the contents were uniformly dissolved, 610 parts of methyl ethyl ketone oxime was added dropwise over 2 hours, and the reaction was carried out while keeping the reaction temperature at 70° C. The infrared spectrum of the reaction mixture was measured during the reaction, and the reaction was continued until absorption of isocyanate groups was disappeared, to obtain a curing agent.

PRODUCTION EXAMPLE 2

Preparation of Epoxy-Modified Cationic base resin]

92 parts of 2,4-/2,6-tolylene diisocyanate (mass ratio 8/2), 95 parts of methyl isobutyl ketone (MIBK), and 0.5 parts of dibutyltin dilaurate were added to a flask equipped with a stirrer, a condenser, a nitrogen inlet tube, a thermometer, and a dropping funnel, and 21 parts of methanol was added thereto dropwise while stirring. The reaction was started at the room temperature, and the temperature of the reaction mixture was raised to 60° C. by heat generation. After 30 minutes of the reaction, 57 parts of ethylene glycol mono-2-ethylhexyl ether was added to the reaction mixture dropwise from the dropping funnel, and 42 parts of bisphenol A-propylene oxide 5-mol adduct was further added. The reaction was carried out mainly within the temperature range of 60 to 65° C. while measuring the infrared spectrum until absorption of isocyanate groups was disappeared.

To thus-obtained blocked polyisocyanate was added 365 parts of an epoxy resin having the epoxy equivalent of 188, which was synthesized from bisphenol A and epichlorohydrin, and the temperature of the mixture was raised to 125° C. Then, 1.0 part of benzyldimethylamine was added to the mixture, and reacted at 130° C. until the epoxy equivalent became 410. 87 parts of bisphenol A was added to the flask and reacted at 120° C., and as a result, the epoxy equivalent became 1,190. After cooling the resultant mixture, 11 parts of diethanolamine, 24 parts of N-methylethanolamine, and 25 parts of a 79% by mass MIBK solution of an aminoethylethanolamine ketimine compound were added to the mixture and reacted at 110° C. for 2 hours. Then, the mixture was diluted with MIBK such that the ratio of non-volatile components was 80%, to obtain an epoxy-modified base resin having a cationic group.

PRODUCTION EXAMPLE 3

Preparation of Main Emulsion 672 parts (solid content) of the base resin obtained in Production Example 2 and 209.1 parts (solid content) of the curing agent prepared in Production Example 1 were uniformly mixed, and to the resultant mixture was added 3% by mass of ethylene glycol mono-2-ethylhexyl ether based on the mass of the solid contents. Formic acid was added to the resultant mixture such that the neutralization ratio (the ratio of neutralizing the cationic groups of the resin) is 41.7%, and 25% by mass of a 25% aqueous solution of zinc acetate and ion-exchange water were added to dilute the mixture such that the mass ratio of the solid contents was 30.0% by mass. Then, the mixture of MIBK and water was removed under a reduced pressure until the mass ratio of the solid contents became 36.0% by mass, to prepare a main emulsion.

PRODUCTION EXAMPLE 4

Preparation of Pigment Dispersing Varnish

A bisphenol-type epoxy resin having an epoxy equivalent of 450 was reacted with a 2-ethylhexanol-half-blocked isophorone diisocyanate. The resultant was converted to a tertiary sulfonium with 1-(2-hydroxyethylthio)-2-propanol and dimethylolpropionic acid, to prepare a resin varnish for dispersing pigments having the tertiary sulfonium conversion ratio of 70.6% by mass and the solid resin content of 60% by mass.

EXAMPLE 1

<Preparation of Lead-Free Electrodeposition Coating Composition 50.0 parts of the resin varnish for dispersing pigments produced in Production Example 4, 100.0 parts of ion-exchange water, and 100.0 parts of the granular mixture shown in Table 1 were dispersed by a sand grinding mill, and further grinded until the particle size became 5 µm or less, to obtain a dispersion paste containing 52.0% by mass of the solid contents, which contains 40% by mass of monobutyltin oxide and the pigments, and 12% by mass of the solid resin.

TABLE 1

| Granular mixture | Mass ratio | Mass ratio based on total of pigments |
|---|---|---|
| Monobutyltin oxide | 1.5 | — |
| Titanium dioxide | 47.5 | 48.2 |
| Carbon black | 1 | 1 |
| Kaolin | 50 | 50.8 |

Then, 2,000 parts of deionized water, 1,500 parts of the main emulsion of Production Example 3, and 500.0 parts of the dispersion paste were mixed to obtain a lead-free electrodeposition coating composition having the solid content of 20.0% by mass. The mass ratio of the monobutyltin oxide to the solid contents of the binder resin was 0.5% by mass, and the zinc ion content of the composition was 700 ppm.

<Electrodeposition Coating>

A sample of a cold-rolled unprocessed steel plate was prepared. The sample was degreased and pretreated with a zinc phosphate-based chemical treatment agent (trade name SURFDYNE 5000, manufactured by Nippon Paint Co., Ltd.) to be used as a negative electrode, and the above electrodeposition coating composition was electrodeposited under the conditions of the applied voltage of 150 to 250 V and the bath temperature of 30° C. to obtain an electrodeposition coating film having the dry thickness of 25 μm. The electrodeposition coating film was washed with water and baked at 170° C. for 20 minutes. The electrodeposition coating film was subjected to a curability test (an acetone rubbing test) and evaluated with respect to the transfer of tin compounds from the electrodeposition coating film to an upper film formed on the electrodeposition coating film. The results are shown in Table 2.

<Acetone Rubbing Test>

The surface of the electrodeposition coating film was rubbed back and forth 5 or 6 times with gauze soaked with acetone. The surface was evaluated with respect to discoloring and glossiness, and the sample with no changes of the color and the glossiness was considered as a satisfactory product.

<Tin Compound Transfer Test>

A chipping primer (T-5H manufactured by Kansai Paint Co., Ltd.) was applied to the electrodeposition coating film such that the film of the chipping primer has a dry thickness of 3 μm, and baked at 140° C. for 20 minutes. The tin atom concentration (% by mass) of the surface of the chipping primer film was measured by ESCA.

<Adhesion Test of Electrodeposition Coating Film>

A chipping primer (T-5H manufactured by Kansai Paint Co., Ltd.) was applied to the electrodeposition coating film such that the film of the chipping primer has a dry thickness of 3 μm, an intermediate coating (HS-48 manufactured by Kansai Paint Co., Ltd.) was applied to the chipping primer film, and the applied compositions were baked at 140° C. for 20 minutes. The adhesion of the films was evaluated by a grid test (1 mm).

EXAMPLES 2 TO 3 AND COMPARATIVE EXAMPLES 1 TO 4

Lead-free electrodeposition coating compositions were prepared, electrodeposited to samples, and evaluated with respect to corrosion resistance, in the same manner as Example 1 except for changing the amounts of the aluminum tripolyphosphate pigment, the silicon oxide pigment, and the other pigments. The results are shown in Table 2.

TABLE 2

| | Items | Example 1 | Example 2 | Example 3 | Example 4 | Comparative Example 1 | Comparative Example 2 | Comparative Example 3 | Comparative Example 4 |
|---|---|---|---|---|---|---|---|---|---|
| Tin compound | Monobutyltin oxide | 0.5 | 2.0 | 4.0 | 1.5 | — | — | 0.5 | 0.5 |
| | Monobutyltin trioctanoate | — | — | — | — | — | — | — | — |
| | Dibutyltin oxide | — | — | — | 0.5 | 0.3 | 2.0 | 1.5 | — |
| Zinc ion content (ppm) | | 700 | 730 | 710 | 690 | 720 | 690 | 690 | |
| Pigment | Titanium dioxide | 48.2 | 45.7 | 47.8 | 48.2 | 48.5 | 45.7 | 45.7 | 48.2 |
| | Carbon black | 1.0 | 1.1 | 1.1 | 1.0 | 1.0 | 1.1 | 1.1 | 1.0 |
| | Kaolin | 50.8 | 53.2 | 51.1 | 50.8 | 50.5 | 53.2 | 53.2 | 50.8 |
| Evaluation | Acetone rubbing test | Excellent | Excellent | Excellent | Excellent | Poor | Excellent | Excellent | Good |
| | Tin compound transfer test | 0.1 | 0.2 | 0.3 | 0.8 | 0.3 | 3.2 | 2.7 | 0.1 |
| | Grid adhesion test (residual ratio) | 100/100 | 100/100 | 100/100 | 100/100 | 100/100 | 50/100 | 50/100 | 100/100 |

The amounts of the tin compounds were shown as the mass ratio (% by mass) to the solid contents of the binder resin; the zinc ion content (ppm) is a zinc compound concentration of a supernatant liquid obtained by centrifuging each composition for 1 hour at 12,000 round per minute; the amount of each pigment is shown as the mass percentage; and the residual ratio of the grid adhesion test is a ratio of the chipping primer films not peeled off from the intermediate coating films.

It was clear from the above results that the lead-free electrodeposition coating compositions, which contain a particular amount of the monobutyltin compound and a particular concentration of the zinc ions based on the solid contents of the binder resin comprising the cationic base resin and the crosslinking agent, showed sufficient film curability and emitted less tin compounds. On the other hand, the composition of Comparative Example 1 using a small amount of dibutyltin oxide showed insufficient film curability, and the compositions of Comparative Examples 2 and 3 using a large amount of dibutyltin oxide emitted more tin compounds, thereby resulting in reduction of adhesion between the coating films.

The lead-free cationic electrodeposition coating composition of the present invention contains a particular amount of the monoalkyltin compound to show excellent film curability. Further, the monoalkyltin compound has low volatility, and thereby, is hardly transferred to the chipping primer film or the intermediate coating film in the processes of forming the electrodeposition coating film. Thus, the composition can form the electrodeposition coating film with excellent film performances. Furthermore, the aminoepoxy resin can be used as the cationic base resin to increase the corrosion resistance. Therefore, the coated article of the present invention can be used for products requiring high quality and splendid appearance, such as automobile bodies and home electric appliances.

The invention claimed is:
1. A lead-free cationic electrodeposition coating composition comprising:
  a binder resin and one or more organotin compounds as a curing catalyst, wherein the binder resin comprises a cationic base resin and a block isocyanate cross linking agent, a mass ratio of the one or more organotin compounds to solid contents of the binder resin is approximately 0.1 to 10% by mass, and the organotin compounds comprise more than approximately 50% by mass of a monobutyltin oxide based on the total mass of the one or more organotin compounds, and wherein the lead-free cationic electrodeposition coating composition comprises approximately 100 to 2,000 ppm of zinc ions.

2. The lead-free cationic electrodeposition coating composition according to claim 1, wherein the cationic base resin is an amino-epoxy resin.

3. A coated article comprising:

a substrate and an electrodeposition coating film formed on the substrate, wherein the electrodeposition coating film comprises a lead-free cationic electrodeposition coating composition which comprises a binder resin and one or more organotin compounds as a curing catalyst, wherein the binder resin comprises a cationic base resin and a block isocyanate cross linking agent, a mass ratio of the one or more organotin compounds to solid contents of the binder resin is approximately 0.1 to 10% by mass, and wherein the organotin compounds comprise more than approximately 50% by mass of a monobutyltin oxide based on the total mass of the one or more organotin compounds, and wherein the lead-free cationic electrodeposition coating composition comprises approximately 100 to 2,000 ppm of zinc ions.

4. The coated article according to claim 3, wherein the coated article comprises a film at least partially composed of a chipping primer formed on the electrodeposition coating film.

5. The coated article according to claim 4, wherein the chipping primer is a primer which utilizes a polyolefin as a base resin.

6. A lead-free cationic electrodeposition coating composition comprising:

a binder resin and one or more organotin compounds as a curing catalyst, wherein the binder resin comprises a cationic base resin and a block isocyanate cross linking agent, a mass ratio of the one or more organotin compounds to solid contents of the binder resin is approximately 0.1 to 10% by mass, and the organotin compounds comprise more than approximately 50% by mass of a monobutyltin oxide based on the total mass of the one or more organotin compounds, wherein the lead-free cationic electrodeposition coating composition comprises approximately 100 to 2,000 ppm of zinc ions, and wherein the cationic base resin is an amino-epoxy resin.

7. A coated article comprising:

a substrate and an electrodeposition coating film formed on the substrate, wherein the electrodeposition coating film comprises and lead-free cationic electrodeposition coating composition which comprises a binder resin and one or more organotin compounds as a curing catalyst, wherein the binder resin comprises a cationic base resin and a block isocyanate cross linking agent, a mass ratio of the one or more organotin compounds to solid contents of the binder resin is approximately 0.1 to 10% by mass, and the organotin compounds comprise more than approximately 50% by mass of a monobutyltin oxide based on the total mass of the one or more organotin compounds, wherein the lead-free cationic electrodeposition coating composition comprises approximately 100 to 2,000 ppm of zinc ions, and wherein the cationic base resin is an amino-epoxy resin.

* * * * *